(12) United States Patent
Staiger

(10) Patent No.: US 8,131,878 B2
(45) Date of Patent: Mar. 6, 2012

(54) SELECTIVE DISRUPTION OF DATA TRANSMISSION TO SUB-NETWORKS WITHIN A PROCESSING UNIT NETWORK

(75) Inventor: Dieter Staiger, Weil Im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 11/908,984

(22) PCT Filed: Jul. 18, 2005

(86) PCT No.: PCT/EP2005/053446
§ 371 (c)(1),
(2), (4) Date: Sep. 18, 2007

(87) PCT Pub. No.: WO2006/051004
PCT Pub. Date: May 18, 2006

(65) Prior Publication Data
US 2008/0183900 A1 Jul. 31, 2008

(30) Foreign Application Priority Data
Nov. 11, 2004 (EP) .................................... 04105704

(51) Int. Cl.
*G06F 15/173* (2006.01)
*G06F 3/00* (2006.01)
*G06F 13/00* (2006.01)
*G06F 7/00* (2006.01)
*H03K 17/16* (2006.01)

(52) U.S. Cl. .................. 709/249; 710/1; 700/2; 701/36; 327/392

(58) Field of Classification Search ................... 709/249, 709/238–244; 710/316; 701/29–35, 24
See application file for complete search history.

(56) References Cited

U.S. PATENT DOCUMENTS

| | | | |
|---|---|---|---|
| 5,016,163 A | 5/1991 | Jesshope et al. | |
| 5,689,661 A | 11/1997 | Hayashi et al. | |
| 5,692,123 A | 11/1997 | Logghe et al. | |
| 5,872,477 A * | 2/1999 | Price, Jr. | 327/392 |
| 5,948,025 A | 9/1999 | Sonoda | |
| 5,957,985 A * | 9/1999 | Wong et al. | 701/33 |
| 6,320,274 B1 * | 11/2001 | Goetze et al. | 307/9.1 |
| 6,393,020 B1 * | 5/2002 | Patton | 370/362 |

(Continued)

FOREIGN PATENT DOCUMENTS

JP 3283842 12/1991

(Continued)

*Primary Examiner* — Ashok Patel
*Assistant Examiner* — Joseph Gazda
(74) *Attorney, Agent, or Firm* — DeLizio Gilliam, PLLC

(57) ABSTRACT

A network of processing units having at least one switch that allows disruption of the network between a first and a second processing units is provided. Disruption of the network by means of the switch effectively disconnects the first processing unit from the network and couples the first processing unit to a controller of the network. The controller is adapted to exchange data with the disconnected processing unit and thereby allows selective and direct data exchange with a selected processing unit. In particular, in the framework of heterogeneous and hierarchical networks of processing units, the switch techniques provide direct access to processing units and sub-networks and allow for an efficient and fast performance of diagnostic and maintenance procedures of sub-networks and their corresponding processing units, such as performing a flashing procedure.

16 Claims, 5 Drawing Sheets

U.S. PATENT DOCUMENTS

| | | | |
|---|---|---|---|
| 6,434,459 B2 * | 8/2002 | Wong et al. | 701/36 |
| 6,463,373 B2 * | 10/2002 | Suganuma et al. | 701/48 |
| 2004/0111188 A1 * | 6/2004 | McClure et al. | 701/1 |
| 2004/0236873 A1 * | 11/2004 | Kasame et al. | 710/1 |
| 2005/0090906 A1 * | 4/2005 | Shi et al. | 700/2 |

FOREIGN PATENT DOCUMENTS

| | | |
|---|---|---|
| JP | 10133905 | 5/1998 |

* cited by examiner

SELECTIVE DISRUPTION OF DATA TRANSMISSION TO SUB-NETWORKS WITHIN A PROCESSING UNIT NETWORK

CROSS-REFERENCE TO RELATED APPLICATIONS

This application claims the benefit of priority of European Patent Application No. 04105704.3 filed on Nov. 11, 2004 and entitled "CONCURRENT FLASHING OF PROCESSING UNITS BY MEANS OF NETWORK RESTRUCTURING" hereby incorporated by reference herein for all purposes.

BACKGROUND

1. Technical Field

Embodiments of the present invention relates to the field of restructuring network embedded systems and in particular without limitation to dividing a network of processing units into various sub-networks for diagnostics and maintenance purposes.

2. Description of Related Art

The implementation and embedding of electronic control units (ECU) or processing units is constantly growing in particular within the framework of automobile technology, industrial manufacturing technology as well as home entertainment or home appliances. In all these systems, a processing unit has to fulfill a distinct predefined function. Electronic systems featuring a plurality of such processing units are therefore denoted as networked embedded systems.

Complex electronic embedded systems have a large number of electronic control units that have to communicate with each other and/or have to exchange some data. For example, in today's high-end automobiles there exist up to about 100 processing units or electronic control units (ECU) that provide control of the vehicle functions. Typically, the plurality of electronic control units is arranged in various individual network branches, each of which providing a particular functionality for the vehicle control. Hence, each ECU in an automotive environment is designated and designed for a distinct purpose and features different requirements with respect to real-time behavior, data exchange rate, signal transmission and signal processing.

Therefore, various control units are arranged in sub-networks with respect to their signal processing and signal transmission properties. For example, real-time demanding processing units, like engine control, breaking system or body control are arranged e.g. in a static, or non-reconfigurable, sub-network making use of a real-time and highly reliable bus protocol. Other control units that are, e.g. related to passenger comfort or passenger convenience, like infotainment related control units, may be arranged in a different sub-network making use of a less reliable and low cost communication platform and/or bus protocol.

Typically, the various sub-networks feature a gateway unit or a gateway controller that provides interaction and communication between ECUs of different sub-networks. Hence, the gateway controllers connect the various sub-networks and regulate the communication transfer between the different bus systems.

In the automotive environment the overall architecture of the communication platform between the electronic control units features a heterogeneous and hierarchical structure. This is mainly due to continuous adaptive implementation of various communication technologies into existing electronic embedded systems. However, the heterogeneous and hierarchical structure is rather disadvantageous because the gateway controllers represent bottlenecks for the data transfer within the network and further represent single points of failures. For example, if a particular gateway controller is subject to failure, the entire heterogeneous network will break down. At least the functionality of an involved network branch will no longer be available.

FIG. 1 illustrates a prior art implementation of a networked embedded system 100, featuring a plurality of sub-networks 114, 116, 118, 120 and 140. For example, the sub-network 120 is implemented as a straight bus network and provides communication and data transfer to the processing units 122, 124, 126, 128 and 130. The gateway controller 102 provides access and data transfer between any of the processing units 122, ..., 130 with other processing units of the networked embedded system 100. Furthermore, the sub-networks may feature a different topology and may exploit different bus protocols. Sub-network 114 is implemented by means of the ring-bus topology, sub-network 116 features a star topology and sub-networks 120 and 140 feature a straight bus topology.

For example sub-network 120 might be implemented as a control area network (CAN) bus system or local interconnect network bus system (LIN), sub-network 140 might be implemented as a CAN or any other real-time network and sub-network 116 might be realized as a Flexray bus system. Moreover, the ring-bus network 114 may provide communication for processing units 142, 144, 146, 148 that are related to multi-media applications. Therefore, the ring-bus 114 might be implemented as a media oriented system transport (MOST) bus system.

As can be seen from FIG. 1, the gateway controllers 102, 104, 106, 108, 110 represent bottlenecks for communication between any two or various processing units and hamper diagnosis as well as maintenance of the overall network. Most prior art implementations of automobile networked embedded systems feature a diagnostic port 112 that provides external access to any one of the sub-networks or to any of the processing units. Typically, each processing unit or ECU 122, ..., 126, 132, ..., 138, 142, ..., 148 features a non-volatile memory that may e.g. be implemented as EEPROM or flash memory to store runtime programs, microcode and some key data in a non-volatile way. However, in case of failure or availability of a software update, an updating or modification of the non-volatile memories of various dedicated or of all control units might be required. In particular due to the heterogeneous structure it is often difficult and very cumbersome to exactly allocate a failure of a distinct ECU or a gateway controller. Therefore, even a complete flashing of all memories of all ECUs or processing units might be required.

The diagnostic port 112 therefore serves as an access point to the embedded networked system and provides diagnosis as well as feeding of data streams into the various ECUs and sub-networks. Due to the complex nature of the heterogeneous and hierarchical networked embedded structure, such a complete flashing process requires an insufficient long time, because e.g. slow-speed buses connect high-speed buses and therefore represent indispensable bottlenecks for the flashing procedure. For example for a high-end vehicle, a complete flashing process may take 10 to 18 hours. Since these re-flashing processes have to be performed by trained personnel of vehicle service stations, such a re-flashing procedure is rather cost intensive and is also associated with an unacceptable downtime of the entire vehicle. Due to the continuous tendency of implementing more and more electronic components and electronically controlled systems in the automotive environment, the above described disadvantages may become more and more prominent and need to be solved.

Embodiments of the present invention therefore aims to provide an improved electronic embedded network that allows for an efficient and less time intensive diagnosis and flashing as well as restructuring of electronic control units and entire sub-networks of a network of processing units.

BRIEF SUMMARY

A network of processing units having at least one switch that allows to disrupt the network between a first and a second processing units provided. Disruption of the network by means of the switch effectively disconnects the first processing unit from the network and couples the first processing unit to a controller of the network. The controller is adapted to exchange data with the disconnected processing unit and thereby allows to selectively and directly exchange data with a selected processing unit. In particular in the framework of heterogeneous and hierarchical networks of processing units, the invention provides direct access to processing units and sub-networks and allows for an efficient and fast performance of diagnostic and maintenance procedures of sub-networks and the their corresponding processing units, such as e.g. performing a flashing procedure.

BRIEF DESCRIPTION OF THE DRAWINGS

In the following detailed description, one or more preferred embodiments of the present invention will be described in detail by making reference to the drawings in which.

Figure 1:
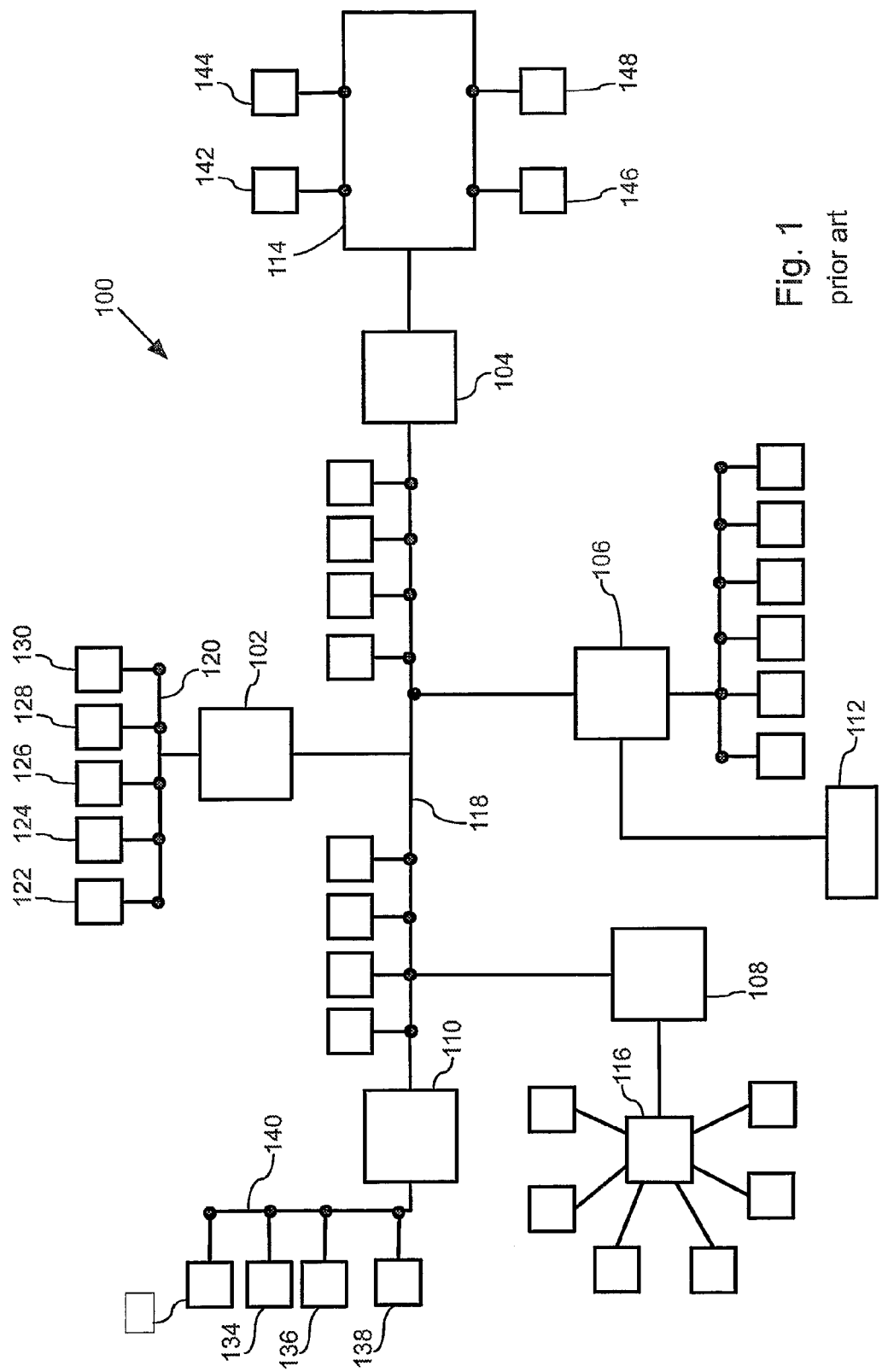
FIG. 1 shows a prior art implementation of a heterogeneous and hierarchical network of processing units.

DETAILED DESCRIPTION OF AN
ILLUSTRATIVE EMBODIMENT

Embodiments of the present invention provides a network of processing units that comprises at least one switch that is adapted to disrupt the network for establishing at least a first sub-network of processing units. The network further comprises a controller that is coupled to any one of the at least one switch. The controller is further adapted to exchange data with any of the processing units of the at least first sub-network. Preferably, the switch is adapted to physically interrupt the network between a first and a second processing unit of the network.

On the one hand such an disruption serves to disconnect a part of the network from the network or gateway controller. On the other hand by coupling the controller to the at least one switch, the controller gains direct access to the disconnected network or network branch. Typically, the at least first sub-network that is created by disrupting the network of processing units represents a network branch that is disconnected from the overall network of processing units and that is disconnected from its network or gateway controller.

The controller is coupled to any of the at least one switch, but data exchange between any of the processing units of the at least first sub-network and the controller may only take place if the at least first sub-network is actually disconnected from the network. Hence, only when the switch disrupts the network and only when the at least first sub-network is effectively established, the controller may have access to any one of the processing units of the at least first sub-network for data exchange. In this way, it is effectively prevented that the controller interferes with gateway controllers or network controllers of the network. Consequently, the controller only gains access to processing units of the network that were disconnected from the network by means of the at least one switch.

The concept of coupling processing units that were disconnected from a network to a controller is universally applicable to any type of networked embedded system in alternate embodiments. Governed by the positioning of switches into the network, various sub-networks can be decoupled from the network and can be coupled to the controller. This allows for selective diagnostics and flashing of particular processing units of a network, irrespective of the network structure and network topology. Division of the network into various sub-networks is mainly limited by the positioning of switches throughout the network.

Embodiments of the present invention are preferably applicable to heterogeneous and/or hierarchical networks of processing units that do not inherently allow for a direct and selective access to particular processing units. For example, in the automotive environment an ECU of a particular sub-network may be accessible via various other sub-networks and corresponding gateway controllers. If this particular sub-network features switch as described herein, the particular ECU may be disconnected from the particular sub-network, thus allowing for a direct access to this particular ECU by means of the controller.

Since the at least first sub-network can be directly coupled to the controller, data exchange between the controller and the processing units of the at least first sub-network can be performed with respect to the at least first sub-network's data exchange and data transmission properties. For example, the data exchange can be performed with the maximum data exchange rate of the at least first sub-network on the basis of the communication protocol of the at least first sub-network.

Hence, transmission of data packets representing status information of a processing unit or transmission of data packets for flashing a processing unit no longer have to be transmitted via various sub-networks of the network but can be directly exchanged between the controller and the dedicated sub-network of processing units. Consequently, the negative impact of gateway controllers on data transmission, representing bottlenecks of the network, can be effectively minimized. This leads to a remarkable increase of the performance of e.g. diagnostic procedures and flashing procedures. Corresponding data throughput and data transmission rates can be effectively increased and the corresponding down-times can be remarkably decreased.

Moreover, an entire flashing procedure can be performed selectively only for a particular sub-network, while the remaining network may remain in its original operation mode. For a maintenance or flashing procedure only parts of the network may be sequentially or simultaneously switched to a maintenance mode while the remaining network further operates. Hence, by selectively and sequentially or simultaneously performing a flashing procedure to various sub-networks, a flashing or diagnostic procedure of the network of processing units may be performed even without shutting down operation of the network.

According to an embodiment of the invention, the controller is further adapted to control the at least one switch of the network. In this way establishing of the at least first sub-network as well as coupling the at least first sub-network to the controller for data exchange with the corresponding processing units is entirely controlled by means of the controller. Disruption of the network for establishing the at least first sub-network can therefore be effectively correlated to data exchange with any of the processing units of the at least first sub-network. Therefore, disruption of the network and establishing of the at least first sub-network may be performed according to one embodiment only if the controller is actually able to transmit data to the at least first sub-network or to receive data from the at least first sub-network. In this way, it is effectively guaranteed, that the at least first sub-network is disconnected from the network if the controller demands a corresponding data exchange.

According to a further embodiment of the present invention, the controller is adapted to control any of the processing units of the at least first sub-network. Preferably, the controller only gains control of the processing units of the at least first sub-network if the at least first sub-network has been disconnected from the network. Moreover, the controller may be provided with access to every function of the processing units and may even overrule any interaction between processing units of the at least first sub-network. In order to control the processing units, the controller is adapted to generate and to transmit appropriate control commands for each of the processing units of the at least first sub-network.

According to a further preferred embodiment of the invention, the controller is adapted to dynamically reconfigure the at least one switch and to dynamically restructure the at least first sub-network. Disruption of the network and establishing the at least first sub-network therefore represents a dynamic process that can be reversed or arbitrarily modified. For example, the at least first sub-network can be disconnected from the network for a sub-network specific flashing procedure and after termination of this flashing procedure, the sub-network may be reconnected to the network by means of the at least one switch. Thereafter, a different sub-network may be established by means of a different switch.

Alternative to a reconnection of the at least first sub-network to the network, the at least first sub-network may be subject to a further disruption if the at least first sub-network features a further switch. In this way, the network of processing units can be sequentially divided into various sub-networks allowing for selective diagnostics and selective maintenance of the various sub-networks. This is of particular advantage for determining and allocating network branches or processing units that are subject to failure.

For example, a first sub-network having ten processing units can be disconnected from the network for a diagnostic purpose. Performing a diagnostic procedure on the first sub-network may provide diagnostic information that at least one processing unit of the sub-network is subject to failure. In order to determine the failed processing unit, the first sub-network may be further divided into two sub-sub-networks, each of which featuring e.g. five processing units. This requires that the first sub-network has an appropriate switch between the fifth and the sixth processing unit. However, by dividing the first sub-network into two sub sub-networks, each of the sub sub-networks can be separately tested. In this way the network of processing units can be iteratively disrupted and divided into smaller sub-networks and a malfunctioning processing unit can be determined on a scale of the smallest possible sub-network. This smallest possible sub-network is mainly governed by a positioning and distribution of the switches in the network structure and therefore depends on the overall design of the network.

According to a further embodiment of the invention, the at least one switch further comprises at least one transmission gate. This transmission gate serves as an ideal switch featuring ideal insulating or conductive electrical properties depending on a driving signal. Typically, the transmission gate has a negligible impact on the network and generally features a very low leakage. Moreover, a transmission gate serves as an electrically controlled switch irrespective of the sign of the signal being carried by the network that is disrupted by means of the transmission gate. Typically, the transmission gate is implemented by means of field effect transistors (FET) that may be realized by means of metal oxide semi-conductor (MOS) technology. Preferably, the transmission gate features a pair of contrary coupled NMOS and PMOS transistors.

According to yet a further embodiment of the invention, the switch comprises a first and a second transmission gate, wherein the first transmission gate provides disruption of the network between a first and a second processing unit and the second transmission gate provides coupling of the first processing unit to the controller. In this embodiment, the first and the second transmission gates are coupled by means of an inverter providing a contrary switching of the first and the second transmission gate. In this way, the first and the second transmission gates are triggered simultaneously and feature opposite switching states.

Whenever the first transmission gate is in conducting mode, the second transmission gate is in disruption mode and vice versa. Making use of such a coupled arrangement of first and second transmission gates, the switch inherently provides only two different operation states. In the first operation state the switch disrupts the network and establishes the sub-network that is disconnected from the network and is therefore coupled to the controller. In the second state the controller is decoupled from the sub-network by means of the switch and the sub-network is connected to the network, hence the sub-network is again coupled into the network.

According to a further embodiment of the invention, the controller is adapted to flash the processing units of the at least first sub-network simultaneously or to flash said processing units within partially overlapping time intervals. Simultaneous flashing and/or flashing within partially overlapping time intervals may refer to individual processing units of a single sub-network but also to processing units of a plurality of different sub-networks. Hence, this simultaneous flashing procedure is not means restricted to a single sub-network but various sub-networks established by various switches can be flashed simultaneously or within partially overlapping time intervals. In this way by, making use of the controller serving as a data stream controller, flashing of various sub-networks and associated control units no longer has to be performed sequentially.

For example, initializing and terminating flashing procedures for various sub-networks might be performed at various points of time. Also, flashing of various sub-networks might be triggered simultaneously, but due to a heterogeneous structure and different data transmission properties of the various sub-networks, the flashing procedure for each sub-network may require a different flashing time.

According to a further embodiment of the present invention, the controller is adapted to replace the functionality of an at least first gateway controller of a sub-network if the at least first gateway controller fails. Additionally, the controller may also replace the functionality of a failed processing unit of a sub-network. Replacing of functionalities of gateway controllers and/or processing units might be realized by interconnecting various sub-networks of processing units. For example, a failed processing unit of a first sub-network might be selectively disconnected from the network by means of at least one switch. This failed processing unit is then coupled to the controller which in turn couples the failed processing unit to a corresponding processing unit of a different sub-network. In this way redundant processing units can be shared among various sub-networks irrespective of the overall network topology.

Since the controller has separate access to any one of the switches, it may compensate for a failure of a particular processing unit and may therefore be adapted to route any data traffic to and from the failed processing unit to a similar processing unit of a different sub-network. In this way, the network architectures described herein, including an embedded controller allow autonomic embedded computing and autonomous compensation of system and/or network failures to be realized. In general, the controller based implementation of the network allows the effective elimination and replacement bottlenecks and single points of failure of the network of processing units.

According to a further embodiment of the invention, the processing units of the network are implemented as electronic control units (ECU) of a vehicle. Even though, the inventive network requires a number of dedicated switches, the inventive network might be realized as an extension to existing electronic networks, in particular in the framework of automotive electronics. For example, the required switches might be incorporated into connectors, such like plug-and-socket connections of existing automotive electronic networks. In this way, also existing automotive electronic networks can be retrofitted with the inventive concept of disrupting the network and coupling the disconnected network to a dedicated controller.

According to a further embodiment of the invention, the processing units of the network are arranged in sub-networks that make use of different communication bus protocols and different network topologies. For instance, the sub-networks may feature network topologies, such as straight bus, star network or ring bus and may further make use of different data transmission standards, such like CAN C, CAN B, LIN, FlexRay, MOST and FireWire. These sub-networks represent network branches of the overall network of processing units and may be interconnected by means of gateway controllers.

Depending on the arrangement of the various sub-networks and their interconnections, the overall network may represent a hierarchical and heterogeneous structure. This type of heterogeneous and hierarchical network is commonly implemented in the automotive environment and the inventive positioning of switches in combination with the controller allows for the selective access of various sub-networks for diagnostic and maintenance purposes. By means of the switches in combination with the controller that is coupled to any one of the switches, the hierarchical and heterogeneous structure of a network can be effectively broken through. By separately coupling any one of the switches to the controller, the network topology becomes rather flat effectively.

In another aspect, embodiments of the present invention provide a controller for establishing at least a first sub-network of a network of processing units. The controller comprises a switching module for disrupting the network by means of at least one switch and for establishing an at least first sub-network. Further, the controller comprises a data transmission module for transmitting data between the at least first sub-network and the controller. The switching module of the controller serves to trigger and to control the switch that is implemented into the network. Preferably, the switching module of the controller controls various switches that are distributed throughout the network and that allow for the selective disconnection of a sub-network from the network and coupling of the disconnected sub-network to the controller.

The data transmission module of the controller serves as a data stream controller and is adapted to receive diagnostic data from any of the connected sub-networks and to transmit flashing data to any of the connected sub-networks. The controller therefore serves to dynamically restructure the network of processing units for selectively and directly flashing distinct processing units of the network. Preferably, the controller is adapted to simultaneously flash various processing units of various sub-networks or to flash said processing units within partially overlapping time intervals.

In another aspect, embodiments of the present invention provide a switch for establishing at least a first sub-network of a network of processing units. The switch is adapted to be implemented between a first and a second processing unit of the network and comprises a first transmission gate that provides disruption of the network between the first and the second processing unit and further comprises a second transmission gate that provides coupling of the first processing unit to a controller. The first and the second transmission gates are complimentary coupled, i.e. when the first transmission gate disrupts the network, the second transmission gate couples the first processing unit to the controller and vice versa. In this way, the switch effectively serves to disconnect at least one processing unit or a branch of the network from the network and to simultaneously couple the disconnected processing units or disconnected network branch to a controller instead. Hence, the switch effectively provides selection of network branches or various processing units and to separately couple selected processing units to a controller for diagnostic or maintenance purposes.

A switch according to one or more embodiments of the present invention, may also be realized as an extension component for existing networks of processing units, e.g. in the framework of automotive electronic networks. One or more such switches may then be incorporated into plug-and-socket connections of an existing electronic network. This allows for a cost effective retrofitting of electronic networks with the described disruption and controlling mechanisms.

In another aspect, the invention provides a method of flashing processing units of a network of processing units that comprises disrupting the network between at least a first and a second processing unit by means of at least one switch, establishing at least a first sub-network on the basis of the at least one disruption and coupling of the at least first sub-network to a controller that in turn is adapted to flash the processing units of the at least first sub-network. The inventive flashing procedure allows to dynamically reconfigure the network of processing units and to selectively flash various sub-networks while remaining parts of the network stay in usual operation mode.

Preferably, the inventive flashing procedure is not restricted to sequentially disconnecting and flashing various sub-networks but also to a simultaneous flashing of various sub-networks and their corresponding processing units.

In still another aspect, embodiments of the present invention provide a computer program product for a controller of a network of processing units. The computer program product is operable to disrupt the network between at least a first and a second processing unit by making use of at least one switch.

The computer program product is further operable to establish at least a first sub-network on the basis of the at least one disruption and to couple the at least first sub-network to the controller and to flash the processing units of the at least first sub-network.

Figure 2:
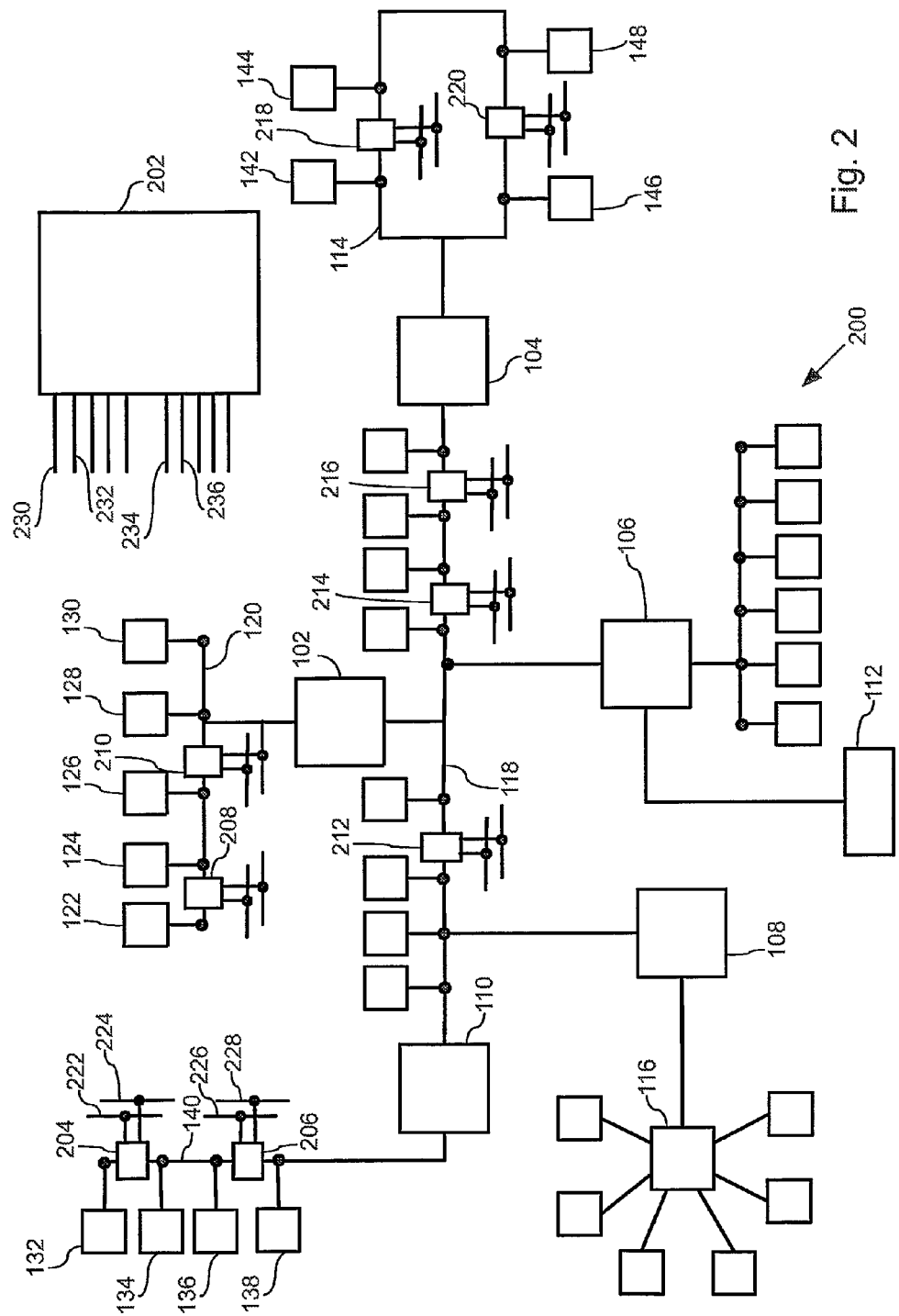
FIG. 2 illustrates the inventive network having a controller and various switches.

FIG. 2 shows the inventive network 200 featuring a plurality of processing units or electronic control units 122, 124, 126, 128, 130, 132, 134, 136, 138, 142, 144, 146 and 148. These processing units are heterogeneously arranged in different sub-networks 114, 116, 118, 120 and 140. Each of these sub-networks may feature different data transmission rates as well as different communication protocols. They may be implemented as bus systems based on e.g. CAN C, CAN B, LIN, FlexRay, MOST or FireWire data transmission standards. Gateway controllers 102, 104, 106, 108 and 110 serve to provide interaction and communication between the various sub-networks and their corresponding processing units.

Further network 200 has a number of switches 204, 206, 208, 210, 212, 214, 216, 218 and 220. Each one of these switches serves to disrupt the network or sub-network at a given position. For example switch 204 is adapted to disconnect processing unit 132 from sub-network 140. Switch 206 for instance serves to disconnect a whole set of processing units 132, 134, 136 from sub-network 140. It serves to disrupt the communication bus between processing units 136 and 138.

Each one of switches 204 and 206 is separately connected to two conductors or wires. Switch 204 is connected to conductor 222 and conductor 224 and switch 206 is connected to conductor 226 and conductor 228. Each one of these conductors 222, ..., 228 is separately connected to the controller 202. For instance, conductor 222 is coupled to conductor 230 of controller 202, conductor 224 is connected to conductor 234, conductor 226 is connected to conductor 232 and conductor 228 is connected to conductor 236. All other illustrated switches 208, ..., 220 are connected to controller 202 in a corresponding way.

By means of conductor 222 control signals are submitted to the switch 204 that allow for switching of the switch, hence to connect or to disconnect processing unit 132 to or from sub-network 140. Conductor 224 in turn serves to provide data transmission between switch 204 and controller 202. It effectively serves for data transmission between controller 202 and any processing units 132 of a disconnected sub-network.

Switches 204, ..., 220 allow for a dynamic restructuring of network 200. This is of particular advantage for diagnostic and maintenance purposes, e.g. when various processing units of the network have to become subject to a software update or a flashing procedure. Instead of shutting down the network 200 and feeding flashing data into diagnostic port 112 that has to be routed to e.g. a remotely located processing unit 132, embodiments of the present invention allow selective disconnection of particular processing unit 132 from network 200 and selective performance of a flashing procedure of processing unit 132 without interfering with the general network traffic. The network does not have to be shut down during a flashing procedure. Instead, only a selected branch of the network is disconnected from the network and becomes subject to a diagnostic or maintenance procedure.

A selective flashing is by no means restricted to a single particular processing unit 132. Moreover, a flashing procedure can be applied to a plurality of processing units 132, 134, 136 forming a sub-network that can be disconnected from the network 200 by means of the switch 206. Based on this sub-network featuring the three processing units 132, 134, 136, a sub-sub-network featuring only one processing unit 132 can be divided by means of the switch 204. In this way a diagnostic procedure can be iteratively applied to smaller and smaller network branches for localizing and determining a particular failure of a processing unit.

Moreover, by making use of both switches 204, 206 also processing units 134, 136 can be effectively disconnected from sub-network 140. Switching of switch 206 in general disconnects all three successive processing units 136, 134, 132 from sub-network 140. However, by switching switch 204, processing unit 132 can be disconnected from the sub-network formed by these three processing units and might be coupled to processing unit 138 via switch 206 and controller 202. In a similar way also the processing units 134, 136 can be decoupled from the sub-network or bus 140 and their functionality can be coupled to other sub-networks, e.g. sub-network 114, 116, 118 or 120.

Hence with embodiments of the present invention, sub-networks can be dynamically established, disconnected from sub-networks, and might be coupled to other network branches of network 200. This allows for a dynamic reconfiguration of the network and serves to break through the hierarchical and heterogeneous structure of network 200. This additionally allows implementation of redundant processing units into network 200 that can be coupled to various network branches or sub-networks of the network on demand, e.g. when a comparable processing unit becomes subject to failure. In this way, dynamic reconfiguration of the network by means of the controller 202 and the various switches allows compensation for failures of processing units and network branches. Consequently, single points of failure of a network can be effectively eliminated and the failsafe as well as the reliability of the entire network may remarkably increase.

Network 200 also provides temporary reconfiguration of the network in order to perform diagnostics and flashing procedures only with respect to selected processing units or network branches. In particular, controller 202 is further adapted to perform numerous flashing and/or diagnostic procedures in parallel. For instance, processing unit 132 as well as processing unit 122 may be simultaneously disconnected from their corresponding network branches 140, 120 and a flashing procedure for both processing units 132, 122 can be performed simultaneously or at least within partially overlapping time intervals. This is of general advantage, because of the simultaneous flashing the overall flashing time can be remarkably reduced. Also, when processing units 132, 122 require the same set of flashing data, a respective simultaneous flashing of processing units 132 and 122 with a common set of flashing data generally allows data storage requirements for the flashing procedure to be reduced.

Also, by separately connecting various processing units 132, 122 to controller 202, a flashing procedure can be performed with respect to the individual data transmission properties of the processing units 132, 122 and with respect to their communication protocol. In this way, it is effectively prevented that flashing data has to be routed through a sub-network that features a limited or very poor data transmission rate.

The dynamic selection of sub-networks, their disconnection from sub-networks and network 200 and coupling to controller 202 is mainly governed by the position of switches in the network 200. Therefore, switches are preferably placed into network 200 with respect to the functionality of the processing units. Also, switches might be placed with respect to reliability and importance of neighboring processing units. For instance, when sub-network 140 features a real-time network that is related to security systems like engine control or breaking system of a vehicle, it is reasonable to introduce a large amount of switches. In case of failure even a single failed processing unit can be disconnected from sub-network 140 and the entire sub-network may remain intact.

Other sub-networks, such as network 114 that are related to less important functions of a vehicle, like infotainment or comfort related functions of the vehicle may be provided with less switches, because a failure of a particular processing unit or of the entire network branch has a comparatively minor impact on the overall functionality of overall network 200 and the general functionality of the vehicle. Therefore, placing and positioning of the switches may be performed with respect to the general architecture of network 200, the functionality of the processing units, the reliability of the processing units as well as their impact on the network in case of a failure.

Figure 3:
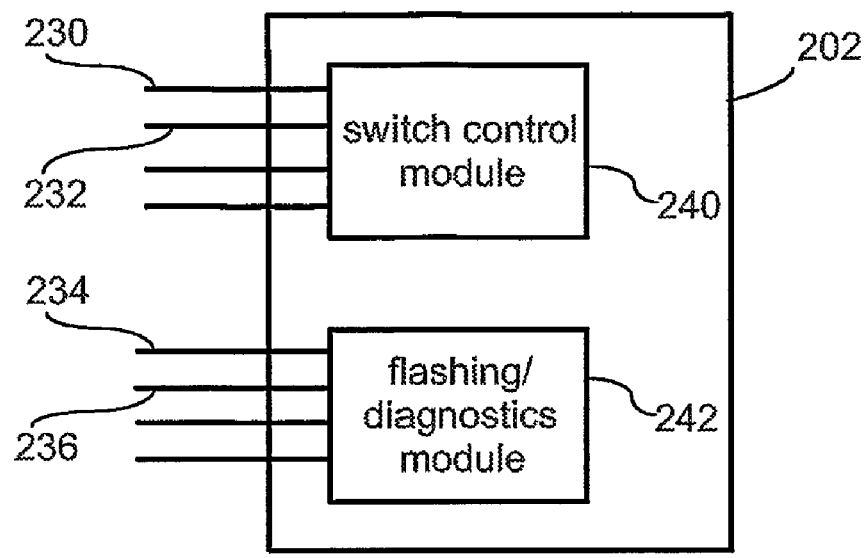
FIG. 3 shows a schematic block diagram of the controller.

FIG. 3 schematically shows a block diagram of controller 202 that has a switch control 240 and a flashing and diagnostics module 242. The switch control of controller 202 serves to trigger the switches 204, . . . , 220 of network 200. The flashing and diagnostics module 242 serves to provide flashing data to the sub-networks that are established by means of the switches 204, . . . , 220. Also, flashing and diagnostics module 242 serves to receive diagnostic data that is generated by the processing units of an established sub-network.

The concurrent and simultaneous providing of flashing data to various electronic control units, e.g. control units 134, 136, . . . , leads to a significant increase of data transmission bandwidth of the overall network and serves to improve the flashing speed.

Additionally, flashing and diagnostics module 242 may identify malfunctioning of processing units and may autonomously compensate a failure of a processing unit by invoking disconnecting a similar processing unit from a different sub-network that is adapted to take over the functionality of the failed processing unit. This similar processing unit then effectively replaces the functionality of the failed one and is effectively coupled to the sub-network of the failed processing unit. In this way, flashing and diagnostics module 242 may trigger switch control 240 to control appropriate switches, that allows to effectively replace a failed processing unit by a corresponding redundant processing unit that may be located in a different sub-network.

Figure 4:
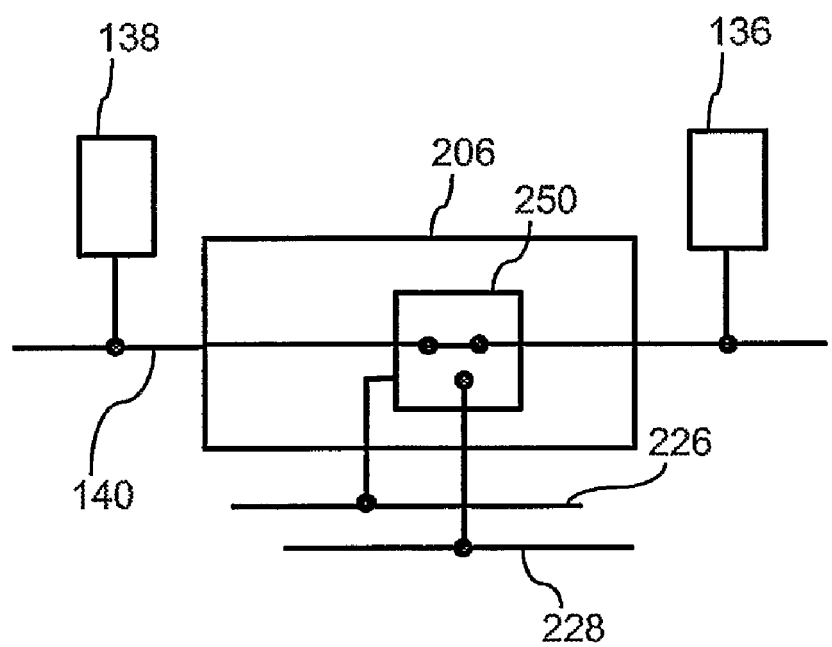
FIG. 4 shows a schematic illustration of the switch, FIG. 5 schematically shows a switch being implemented by means of two transmission gates, FIG. 6 schematically shows the internal structure of a transmission gate, FIG. 7 schematically shows dividing of a star network into two sub-networks.

FIG. 4 schematically illustrates the principle of a switch 206 that is positioned in the sub-network or bus 140 between processing units 138 and 136. Switch 206 has a switch element 250 featuring two switching states. In a first switching state, switch element 250 electrically connects processing units 138 and 136. In this first state, bus 140 is not disrupted and controller 202 is not coupled to bus 140. In the second state, switching element 250 disconnects processing unit 136 from bus 140 and from processing unit 138 but connects and couples processing unit 136 to conductor 228.

Controller 202 is coupled to switch 206 via two conducting wires 226 and 228. Conductor 226 effectively controls switching element 250 and provides triggering sequences generated by controller 202 to switching element 250. Conductor 228 is connected to flashing and diagnostics module 224 of controller 202 and allows transmission of diagnostics and flashing data between controller 202 and processing unit 136. The conductor 228 effectively replaces the functionality of data bus 140 and effectively couples processing unit 136 to controller 202, which in turn may couple processing unit 136 to a different sub-network.

Figure 5:
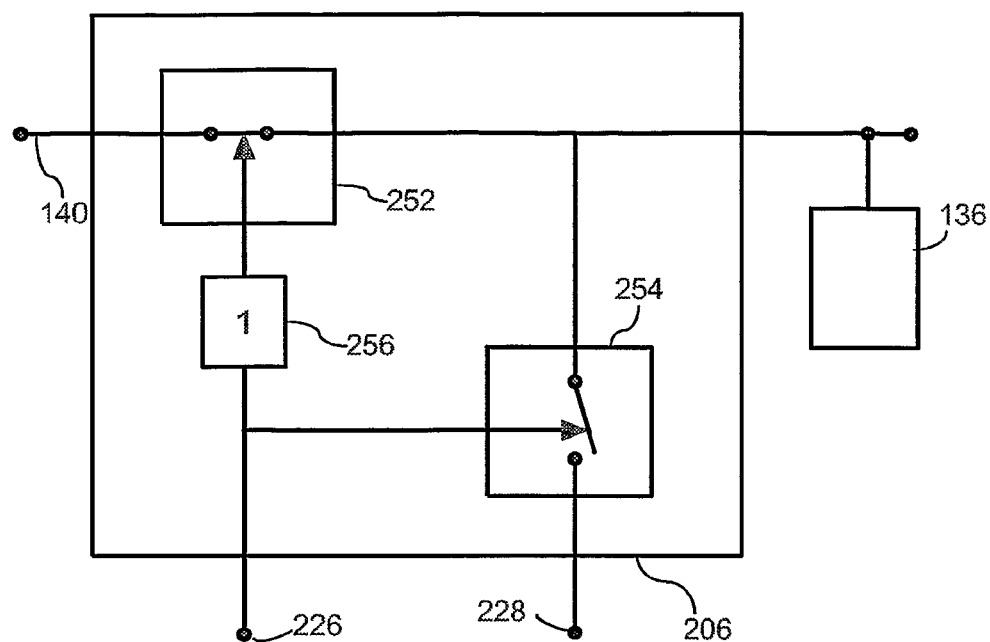

FIG. 5 schematically illustrates the internal structure of switch 206 implemented by means of two transmission gates 252 and 254. Instead of realizing switch 206 by means of a single switching element 250 as illustrated in FIG. 4, in FIG. 5, transmission gates 252 and 254 separately serve to disrupt the sub-network and to couple processing unit 136 to controller 202. Both transmission gates 252, 254 are driven by the conductor 226 that is connected to switch control module 240 of controller 202.

Inverter 256 serves to invert the switching signal transmitted via conductor 226 and therefore guarantees that transmission gates 252, 254 are oppositely driven. Hence, transmission gates 252, 254 are always in different switching states. When transmission gate 252 is open and therefore disrupts sub-network 140, transmission gate 254 is closed and connects processing unit 136 with conductor 228. In the opposite scenario, when transmission gate 254 is open, transmission gate 252 is closed and sub-network 140 remains non-disrupted and processing units 136 and 138 are effectively coupled to each other.

Figure 6:
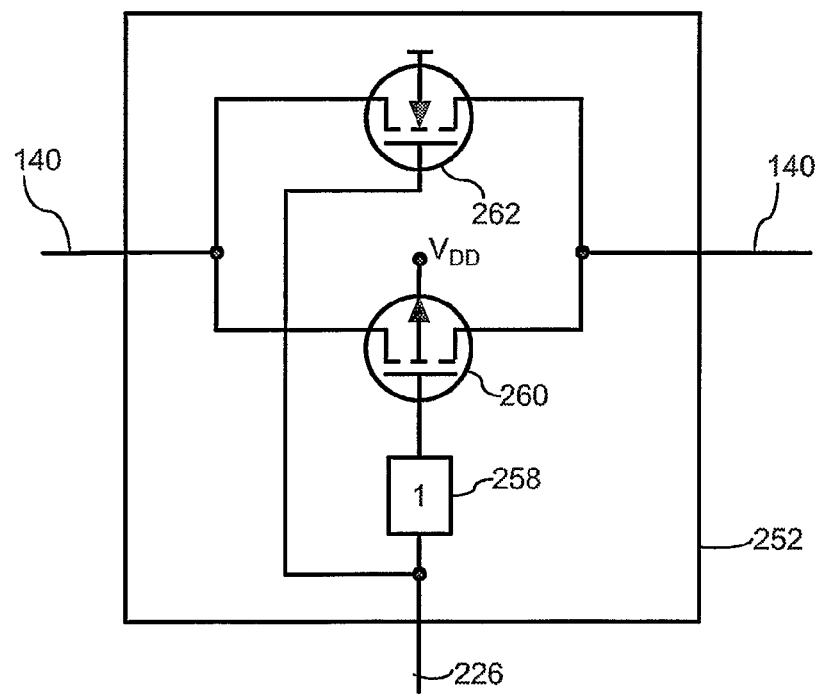

FIG. 6 schematically illustrates the internal structure of transmission gate 252 disrupting the sub-network or bus 140. Transmission gate 252 has two transistors 260, 262 that are implemented as NMOS transistor 260 and PMOS transistor 262. Transistors 260, 262 are coupled in parallel and the gate of transistor 260 is inverted by means of inverter 258 with respect to the gate of transistor 262. Hence, a switching signal provided by means of the conductor 226 serves to trigger transistors 260, 262 in an opposite way. Since the two transistors are implemented as PMOS and NMOS transistors both transistors 260, 262 simultaneously either serve as an insulating or conducting element.

The circuit diagram illustrated in FIG. 6 represents a switch with an almost ideal switching behavior. It features a high resistance and a low leakage when disrupting bus 140 and provides a low electrical resistance in conducting mode, i.e. when the transmission gate is closed. Especially in the closed state, a transmission gate features a low electrical resistance and therefore has a negligible impact on bus 140.

Figure 7:
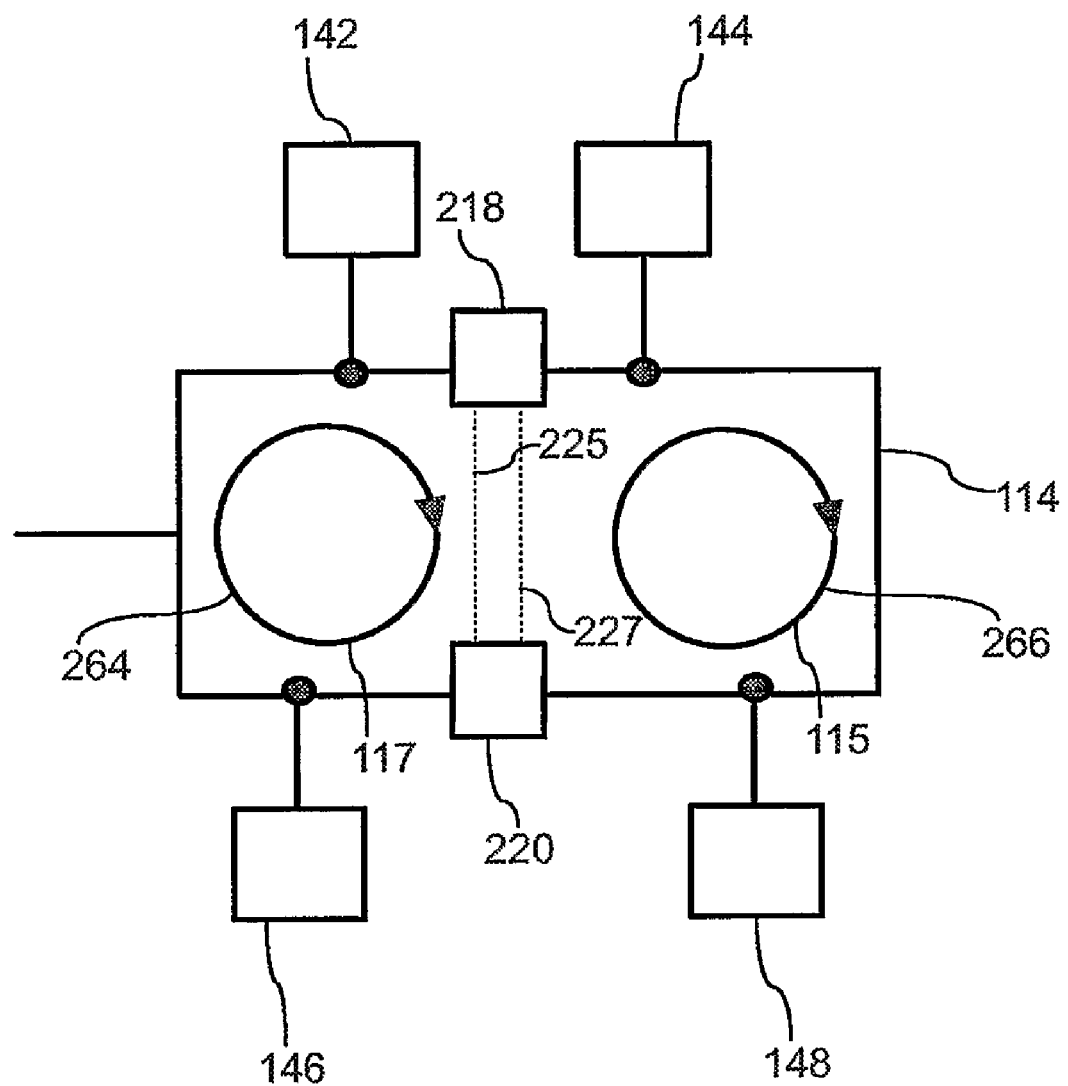

FIG. 7 illustrates a sub-network 140 implemented as a ring bus with four processing units 142, 144, 146 and 148. Further, ring bus 140 has two switches 218 and 220. Switch 218 serves to disrupt ring bus 114 between processing units 142 and 144 and switch 220 serves to disrupt ring bus 114 between processing units 146 and 148. Upon disruption, each of switches 218, 220 establishes a connection to controller 220. Controller 202 in turn may then reconfigure ring bus 114 by coupling switch 218 to switch 220. Consequently, two effective conductors 225 and 227 may be established between two switches 218 and 220. Conductors 225 and 227 only represent a logical coupling between two switches that may be realized by controller 202. Switches 218 and 220 remain physically connected to controller 202 as illustrated in FIG. 2.

Logical conductor 225 effectively couples processing unit 142 and processing unit 146 and logical conductor 227 effectively couples processing unit 144 and processing unit 148. In this way ring bus 114 is divided into two sub-networks as indicated by circles 264 and 266. In this, way two sub-networks 264 and 266 are established by means of an appropriate switching of switches 218 and 220. In particular, sub-network 264 couples processing units 142 and 146 and sub-network 266 effectively couples processing unit 144 and processing unit 138. In this way, embodiments of the present invention not only provide temporary disconnection of processing units and network branches from the overall network but also allows dynamic reconfiguration of a given network topology.

Even though embodiments of the present invention are preferably applicable to heterogeneous networks in the automotive environment, the scope of embodiments of the present invention is by neither limited to applications in the framework of automotive technology nor to heterogeneous and hierarchical network structures. Rather, embodiments of the present invention are universally applicable to various network architectures and various technical fields making use of networked processing units.

What is claimed is:

1. A network of processing units comprising:
a first processing unit sub-network;
a second processing unit sub-network;
a bus coupled with each processing unit of the first processing unit sub-network and of the second processing unit sub-network;
a first switch adapted to disrupt communication to the first processing unit sub-network via the bus and adapted to allow communication to the first processing unit sub-network from a controller via the first switch while communication to the first processing unit sub-network via the bus is disrupted;
a second switch adapted to disrupt communication to the second processing unit sub-network via the bus and adapted to allow communication to the second processing unit sub-network from the controller via the second switch while communication to the second processing unit sub-network via the bus is disrupted; and
the controller coupled with the first and the second switches and adapted to dynamically restructure the network of processing units and to control the first and the second switches to disrupt communication via the bus in accordance with dynamically restructuring the network of processing units, the controller adapted for data exchange with the first processing unit sub-network via the first switch and with the second processing unit sub-network via the second switch.

2. The network according to claim 1, wherein the controller is adapted to control any of the processing units of the first processing unit sub-network and the second processing unit sub-network.

3. The network according to claim 1, wherein the first switch comprises at least one switching element coupled with two conductors, a first of the two conductors adapted to drive a switching signal to the switching element to disrupt communication to the first processing unit sub-network via the bus and the second of the two conductors adapted to carry data to the first processing unit sub-network from the controller while communication to the first processing unit sub-network is disrupted via the bus.

4. The network according to claim 1, wherein the first switch comprises a first transmission gate and a second transmission gate, the first transmission gate being adapted to disrupt communication to the first processing unit sub-network via the bus and the second transmission gate being adapted to allow communication between the controller and the first processing unit sub-network while the first transmission gate disrupts communication to the first processing unit sub-network via the bus.

5. The network of claim 4, wherein the first switch further comprises an inverter coupled with either the first transmission gate or the second transmission gate.

6. The network according to claim 1, wherein the controller is adapted to flash the processing units of the first and the second processing unit sub-networks simultaneously or to flash said processing units within partially overlapping time intervals.

7. The network according to claim 1, wherein the first and the second processing unit sub-networks use different communication bus protocols.

8. The network according to claim 1, wherein the processing units comprise electronic control units of a vehicle.

9. The network according to claim 1, wherein the first and second processing unit sub-networks comprise different network topologies.

10. The network of claim 1, wherein the controller comprises:
a switch control module adapted to generate a switching signal and electronically coupled with the first and the second switches; and
a flashing and diagnostic module electronically coupled to the first and second switches, the flashing and diagnostic module adapted to communicate with the first and the second processing unit sub-networks via the first and second switches respectively for flashing or running diagnostics.

11. The network of claim 10, wherein the switch control module is electronically coupled with the first switch by a first conductor and is electronically coupled with the second switch by a second conductor, and wherein the flashing and diagnostic module is electronically coupled with the first switch by a third conductor and with the second switch by a fourth conductor.

12. The network of claim 1 further comprising:
a third switch coupled with a third processing unit sub-network, the third switch adapted to disrupts communication via the bus to the third processing unit sub-network, wherein the second processing unit sub-network comprises the third processing unit sub-network and wherein the second switch is adapted to disrupt communication via the bus to the third processing unit sub-network when the second switch disrupts communication via the bus to the second processing unit sub-network.

13. A method comprising:
a controller sending a switching signal to a first switch of a plurality of switches in a network of processing units;
the first switch, responsive to the switching signal, preventing data transmission via a bus to a first processing unit sub-network of the network of processing units while allowing data transmission from the controller to the first processing unit sub-network via the switch, wherein each processing unit of the network of processing units is coupled with the bus; and
the controller transmitting data to the first processing unit sub-network via the first switch while data transmission via the bus to the first processing unit sub-network is prevented and while a second processing unit sub-network of the network of processing units remains capable of data transmission via the bus, and the controller sending a second switching signal to a second switch of the plurality of switches to dynamically reconfigure topology of the second processing unit sub-network, wherein the data transmitted from the controller to the first processing unit sub-network corresponds to one of a diagnostic operation and a flashing operation that does not involve the second processing unit sub-network.

14. The method of claim 13 further comprising the controller receiving data from the first processing unit sub-network via the first switch while data transmission via the bus to the first processing unit sub-network is prevented by the first switch.

15. A set of one or more non-transitory machine-readable storage media comprising:
executable program code configured to,
control a plurality of switches throughout a network of processing units to prevent data exchange with a first processing unit sub-network of the network of processing units via a bus and control a first switch of the plurality of switches to allow data transmission to the first processing unit sub-network via the first switch while data exchange via the bus to the first processing unit sub-network is prevented, transmit data to the first processing unit sub-network via the first switch while the data exchange to the first processing unit sub-network via the bus is prevented, and control the plurality of switches throughout the network of processing units to dynamically reconfigure a second processing unit sub-network from a first network topology to a second network topology.

16. The machine-readable storage media of claim 15, wherein the executable program code being configured to control the plurality of switches throughout the network of processing units to prevent data exchange with the first processing unit sub-network of the network of processing units via the bus and control the first switch of the plurality of switches to allow data transmission to the first processing unit sub-network via the first switch while data exchange via the bus to the first processing unit sub-network is prevented comprises the executable program code being configured to generate a switching signal on a first conductor to the first switch, wherein the switching signal causes the first switch to disrupt a connection from the bus to the first processing unit sub-network and to create a connection from a second conductor to the first processing unit sub-network.

* * * * *